United States Patent
Colla et al.

(10) Patent No.: US 11,010,343 B2
(45) Date of Patent: May 18, 2021

(54) ARCHITECTURE, METHOD AND APPARATUS FOR ENFORCING COLLECTION AND DISPLAY OF COMPUTER FILE METADATA

(71) Applicant: JANUSNET PTY LIMITED, Milsons Point (AU)

(72) Inventors: Gregory Alan Colla, Milsons Point (AU); Kien Sen Huang, Milsons Point (AU)

(73) Assignee: JANUSNET PTY LIMITED, Milsons Point (AU)

( * ) Notice: Subject to any disclaimer, the term of this patent is extended or adjusted under 35 U.S.C. 154(b) by 95 days.

(21) Appl. No.: 16/342,041

(22) PCT Filed: Oct. 13, 2017

(86) PCT No.: PCT/AU2017/000219
§ 371 (c)(1),
(2) Date: Apr. 15, 2019

(87) PCT Pub. No.: WO2018/068080
PCT Pub. Date: Apr. 19, 2018

(65) Prior Publication Data
US 2019/0251063 A1    Aug. 15, 2019

(30) Foreign Application Priority Data

Oct. 14, 2016   (AU) ................................ 2016904177

(51) Int. Cl.
*G06F 16/17*   (2019.01)
*G06F 16/16*   (2019.01)
(Continued)

(52) U.S. Cl.
CPC ........ *G06F 16/1734* (2019.01); *G06F 16/164* (2019.01); *G06F 16/168* (2019.01); *G06F 16/38* (2019.01); *G06F 21/00* (2013.01)

(58) Field of Classification Search
CPC .... G06F 16/1734; G06F 16/38; G06F 16/168; G06F 16/164
See application file for complete search history.

(56) References Cited

U.S. PATENT DOCUMENTS

| 8,024,304 | B2 | 9/2011 | Pulfer et al. |
| 8,171,394 | B2 | 5/2012 | Taylor et al. |

(Continued)

OTHER PUBLICATIONS

"JeanusSEAL for Outlook—Features & Benefits"; janusNET; Feb. 28, 2015; 9 pages; web.archive.org/web/20150228095935/http://janusnet.com/janusSEAL/Outlook/features.

(Continued)

*Primary Examiner* — Asher D Kells
(74) *Attorney, Agent, or Firm* — Hayes Soloway PC

(57) ABSTRACT

The present invention provides a system for displaying and capturing file metadata of an application data file stored on a computer; said computer including a processor and memory; said memory storing an operating system for the computer, a kernel of the operating system and Metadata Storage; said computer including a user interface and at least one installed application for interacting with a user which processes said application data file; said system comprising: a Metadata Filter Driver installed on said computer; at least one Metadata Application Thread, which the system injects into said application when a process for execution of said application is created; a Metadata Manager operating on said computer, whereby said Metadata Filter Driver signals said Metadata Manager when said at least one application data file is accessed, which then notifies said Thread appropriate (Continued)

to the at least one installed application which is accessing said application data file.

19 Claims, 7 Drawing Sheets

(51) Int. Cl.
    *G06F 21/00*     (2013.01)
    *G06F 16/38*     (2019.01)

(56) References Cited

U.S. PATENT DOCUMENTS

| | | | |
|---|---|---|---|
| 10,068,100 B2* | 9/2018 | Fay | G06F 21/6227 |
| 2003/0182583 A1 | 9/2003 | Turco | |
| 2006/0235871 A1 | 10/2006 | Trainor et al. | |
| 2006/0248038 A1* | 11/2006 | Kaplan | G06F 16/164 |
| 2006/0294474 A1 | 12/2006 | Taylor et al. | |
| 2008/0104118 A1* | 5/2008 | Pulfer | G06F 16/986 |
| 2009/0307306 A1* | 12/2009 | Jalon | G06F 16/14 |
| | | | 709/203 |
| 2010/0146593 A1 | 6/2010 | Stahl et al. | |
| 2010/0262577 A1* | 10/2010 | Pulfer | G06F 16/93 |
| | | | 707/608 |
| 2011/0314551 A1* | 12/2011 | Turner | G06F 21/604 |
| | | | 726/26 |

OTHER PUBLICATIONS

"Document management system"; Wikipedia; Cited Sep. 7, 2016; Retrieved Apr. 11, 2019; 8 pages; https://en.wikipedia.org/wiki/Document_management_system.

"[MS-FCIADS]: File Classification Infrastructure Alternate Data Stream (ADS) File Format"; Microsoft Corporation; Cited Dec. 16, 2011; Retrieved Apr. 11, 2019; 4 pages; https://docs.microsoft.com/en-us/openspecs/windows_protocols/ms-fciads/629d7a15-54ba-4e1c-a1b0-547afba28485.

"Understanding Custom Document Properties in Microsoft Office Word 2003"; Microsoft Developer Network; Cited Jun. 23, 2016; Retrieved Apr. 11, 2019; 7 pages; https://docs.microsoft.com/en-us/previous-versions/office/office-12/aa537154(v=office.12).

"Introducing Dynamic Access Control"; Technet; Cited Jun. 28, 2016; Retrieved Apr. 11, 2019; 4 pages; https://social.technet.microsoft.com/wiki/contents/articles/14269.introducing-dynamic-access-control.aspx.

"Using File Classification Infrastructure (FCI) and AD RMS to automatically protect sensitive information"; Microsoft Corporation; Jan. 30, 2010; 5 pages; https://blogs.technet.microsoft.com/filecab/2010/01/30/using-file-classification-infrastructure-fci-and-ad-rms-to-automatically-protect-sensitive-information/.

"COM Add-ins Part I: Introducing an Office 2000 Solution for the Entire (Office) Family"; Microsoft Developer Network; Jun. 13, 2014; 6 pages; https://docs.microsoft.com/en-us/previous-versions/office/office-10/aa155767(v=office.10).

"File Classification Infrastructure: Technical White Paper"; Microsoft Download Center; published May 2009; 14 pages; http://download.microsoft.com/download/D/D/3/DD3FB42C-D3C7-47C0-9431-40D80256FB0A/FCI_TDM_WP_May_09.PDF.

"Australian Government security classification system"; Protective Security Policy Framework; Feb. 28, 2015; 2 pages.

"Protectively marking and handling sensitive and security classified information"; Protective Security Policy Framework; Feb. 28, 2015; 2 pages.

\* cited by examiner

ARCHITECTURE, METHOD AND APPARATUS FOR ENFORCING COLLECTION AND DISPLAY OF COMPUTER FILE METADATA

FIELD OF INVENTION

The present invention relates to the field of enforcement of collection and display of computer file metadata and more particularly to a software architecture, method and apparatus for enabling the enforcement of collection and display of computer file metadata.

BACKGROUND

File metadata information for enterprise is considered of vital importance for consistent identification and reference, attribution, resource integrity checking, classification, describing resource relationships, searching, sorting, generation of reports, online access, system automation and many other functions.

File metadata is not limited to simple file attributes such as its title, subject, author, creation date, but can contain much more information relevant to the business processes and systems of the enterprise, such as a document's revision number, its status, whether it is draft or final, who approved its release, company, copyright owner, number of pages, number of words, keywords, case identifier or document identifier. If the file is a photograph, the metadata can contain location details, when the photo was taken, the subject of the photo and details of the camera that took the photo, such as lens focal length and aperture settings. If the file is an audio recording, its metadata may contain recoding information, such as the artist, when it was recorded, equipment that was used for recording, and the name and location of the recording studio.

Files can be stored on many different media, such as file servers, Document Management Systems (DMS) (1), workstation hard drives, file servers, removable storage media (such as "thumb drives"), or in the cloud.

DMS systems are often configured to collect necessary metadata when files or documents are added to the system. This metadata may be generated, based on the content of the source file, or generated automatically, or the system may prompt the user to supply the metadata. In general, DMS systems store metadata in databases (catalogues), logically separate from the location of the file. For effective DMS system operation, an organisation must be prepared to commit resources to the purchasing, design, commissioning and operation of the system. Users must traverse a learning curve to use these systems effectively. Such overheads may be prohibitive for smaller organisations.

An alternative to storing file metadata in a database, is to store it in the file system itself, such as in Microsoft NTFS Alternate Data Streams (2) or Apple resource forks. Alternatively, file metadata can be stored in the file itself. For example, Microsoft Word has the capability to collect document properties, such as the document title, subject and author, which is stored in the file. Additional metadata can be collected and stored with the use of allow for the addition of Custom Document Properties (3). Such metadata can be used for automated file access control (4) and encryption (5). Only a minority of the applications in use by an organisation would have this capability. Furthermore, the entry of metadata is up to the operator, and can easily be forgotten.

Organisations, such as governments and enterprises, have security classification policies which define security classification systems and handling protocols, so that information generated by the organisation is handled correctly, both by humans and by computer systems, based on the information's sensitivity. For example, the Australian Government has published its security classification system (6), and its handling protocols (7). At a minimum, such systems and protocols normally define the appropriate range of classifications, and when a security classification should be applied, such as when a document is saved, or prior to printing, and where the security classification should be shown on a document.

Solutions exist to add security classification metadata to Microsoft Office documents when the associated software application is being used (8) (9). However, these solutions are limited to applications where COM Application Programming Interfaces (APIs) are available in the application (10), and the application's API allows for the programmatic extension of the application's user interface. As such, these solutions do not provide for wider usage in other computer applications, such as Microsoft's Paintbrush, Notepad or applications which do not have an extension API, or where an application extension API is available, but does not provide the capability to dynamically modify the user interface. Furthermore, these solutions will not work in a non-Windows environment, such as Apple's OS X, BSD, Linux, Google Android, or other operating systems. As such, the scope of such solutions is quite limited, so security classification policies, or metadata collection policies cannot be fully enforced by these solutions.

Furthermore, the application of these solutions to a document can modify the document, say by adding metadata to the header or footer of a document, or otherwise within the text of the document. Such process can be contrary to an organisation's business practices. For example, when a document is sent by one organisation to a second organisation, the second organisation may want to keep the document intact in the form in which it was sent. Modifying the document's text in any way may diminish future evidentiary value of the document.

Solutions also exist to apply classification metadata to other file types (images, video, audio, PDF) programmatically (11). Such implementations, however, do not enforce user metadata policy, in that the display of file metadata when viewing the contents of a file may not be noticeable or conspicuous, nor do they enforce the mandatory collection of metadata.

Background art includes:

Taylor et al (12) describe systems and methods for providing user interface to receive metadata from a user for an application and associated generated file. This system is limited to applications where the method is a feature of the native application. Its limitation is that does not work for applications which are already compiled and deployed to the computer. It does not provide a mechanism to enforce organisation policy of when the user must enter metadata.

Turco (8) describes a plug-in which extends Microsoft Office functionality to collect and manage file associated security classification metadata. This method is only appropriate for applications which have an extension application programming interface. Its limitation is that it will not work for applications which do not have an extension API.

Stahl et al (13) describe a method of securing access to a file in a document management application using security classification metadata. This system is limited in that it only operates on files which are stored in the document management application. It does not work on files stored outside of that system, such as on a workstation's file system nor on a network file share.

Trainer et al (14) describe method and system for a storage of files and associated file metadata. This system is limited in that the files are stored within the system's own persistent storage. It does not work with a workstation's own file storage, not with network file storage, such as a Storage Area Network (SAN). Furthermore, user interaction with the system is via the system's own user interface. It does not interact with the user when the user is using an application when processing a file.

In summary, there is a gap in the current field whereby organisations provide a range of computer applications for users to complete business tasks (FIG. 7, shown as θ) and there is a subset of the organisation's applications (FIG. 7, shown as φ) which provide a native function to enter and store custom metadata, there is a subset of the organisation's applications (FIG. 7, shown as λ) which provide a function to enforce metadata collection and there is a subset of the organisation's applications (FIG. 7, shown as ω) which have an extension API, whereby an extension can be used to enforce metadata policy. The organisation requires users to comply with metadata policy, such as the mandatory collection of appropriate metadata when files are saved, and/or users must be shown file metadata when operating on a file. Of all the applications used by the organisation, θ, only a small subset, shown shaded, can provide the required functionality natively, or with the addition of an application extension. These prior art approaches are specific to the application being used to operate on the file, the operating system on which the application is executing, intentionally modifying the contents of the file, or not having the ability to collect metadata at appropriate times.

These problems may be addressed or ameliorated in at least some embodiments of the present invention, which in at least some preferred forms provide an architecture, method and apparatus to enforce metadata policy across a plethora of computer applications and operating systems.

In alternative forms these problems may be addressed or ameliorated in at least some embodiments of the present invention, which in at least some preferred forms provide an architecture, method and apparatus to enforce metadata policy across a plethora of computer applications and operating systems without modifying the content of the file.

REFERENCES

1. Wikipedia. Document management system. [Online] [Cited: 7 Sep. 2016.] https://en.wikipedia.org/wiki/Document_management_system.
2. Microsoft Corporation. File Classification Infrastructure Alternate Data Stream (ADS) File Format. [Online] 16 Dec. 2011. https://msdn.microsoft.com/en-us/library/hh537062.aspx.
3.—. Understanding Custom Document Properties in Microsoft Office Word 2003. *Microsoft Developer Network*. [Online] January 2004. [Cited: 23 Jun. 2016.] https://msdn.microsoft.com/en-us/library/aa537154.
4.—. Introducing Dynamic Access Control. Technet. [Online] 1 Nov. 2012. [Cited: 28 Jun. 2016.] http://social.technet.microsoft.com/wiki/contents/articles/14269.introducing-dynamic-access-control.aspx.
5.—. Using File Classification Infrastructure (FCI) and AD RMS to automatically protect sensitive information. [Online] 30 Jan. 2010. https://blogs.technet.microsoft.com/filecab/2010/01/30/using-file-classification-infrastructure-fci-and-ad-rms-to-automatically-protect-sensitive-information/.
6. Australian Government. Australian Government security classification system. *Protective Security Policy Framework*. [Online] 6 May 2015. https://www.protectivesecurity.gov.au/informationsecurity/Pages/AustralianGovernmentSecurityClassificationSystem.aspx.
7.—. Protectively marking and handling sensitive and security classified information. *Protective Security Classification Framework*. [Online] 6 May 2015. https://www.protectivesecurity.gov.au/informationsecurity/Pages/ProtectivelyMarkingAndHandlingSensitiveAndSecurityClassifiedInformation.aspx.
8. Turco, Anthony Jay. Electronic document classification and monitoring 2003/0182583 A1 US, 25 Sep. 2003.
9. Pulfer et al. Document classification toolbar. U.S. Pat. No. 8,024,304, 26 Oct. 2006.
10. Microsoft Corporation. COM Add-ins Part I: Introducing an Office 2000 Solution for the Entire (Office) Family. *Microsoft Developer Network*. [Online] May 1999. [Cited: 23 Jun. 2016.] https://msdn.microsoft.com/en-us/library/aa155767.
11.—. File Classification Infrastructure: Technical White Paper. *Microsoft Download Center*. [Online] May 2009. http://download.microsoft.com/download/D/D/3/DD3FB42C-D3C7-47C0-9431-40D80256FB0A/FCI_TDM_WP_May_09.pdf.
12. Taylor et al. Methods and Systems for Providing a Customized User Interface for Viewing and Editing Meta-Data. U.S. Pat. No. 8,171,394 B2, 1 May 2012.
13. Stahl, Noah Z, Bartlett, Wendy S and Nrooks, Randall S. Secure Document Management. 2010/0146593 A1 US, 10 Jun. 2010.
14. Trainor, James and Pike, James Thomas. Method and System for Managing Metadata Information. 2006/0235871 A1 US, 19 Oct. 2006.

NOTES

The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

SUMMARY OF INVENTION

Definitions

Application: a set of instructions executable by a computer in order that the computer may carry out a function. An application may be a text editor program or it may be a spreadsheet program for example. It is commonly the case that applications read data from files in order to execute a programmed function and then output data to files as a result of execution of the programmed function.

Persistent storage: any storage device that retains data after power to that device is shut off. It is also sometimes referred to as non-volatile storage.

Hard disk drives and solid-state drives are common types of persistent storage. This can be in the form of file, block or object storage. On the other hand, RAM and cache are typically non-persistent, and data is erased when power is turned off. However, certain types such as non-volatile RAM and flash-based RAM are persistent. Persistence is beneficial so that in the event of a crash or reboot, data is not lost.

Application Program Interface (API): a set of subroutine definitions, protocols, and tools for building application software. In general terms, it is a set of clearly defined methods of communication between various software components. A good API makes it easier to develop a computer program by providing all the building blocks, which are then put together by the programmer. An API may be for a web-based system, operating system, database system, computer hardware or software library. An API specification can take many forms, but often includes specifications for routines, data structures, object classes, variables or remote calls. POSIX, Microsoft Windows API, the C++ Standard Template Library and Java APIs are examples of different forms of APIs. Documentation for the API is usually provided to facilitate usage.

Just as a graphical user interface makes it easier for people to use programs, application programming interfaces make it easier for developers to use certain technologies in building applications. By abstracting the underlying implementation and only exposing objects or actions the developer needs, an API reduces the cognitive load on a programmer.

Metadata: broadly, metadata is data that provides information about data. A computer file will contain file data. In at least some instances there may be associated metadata with that file data. The metadata is logically distinct from the file data in most instances. The metadata may describe or summarise aspects of the file data and or it may specify rules for use of the file data.

Thread: a thread of execution is the smallest sequence of programmed instructions that can be managed independently by a scheduler, which is typically a part of the operating system. The implementation of threads and processes differs between operating systems, but in most cases a thread is a component of a process. Multiple threads can exist within one process, executing concurrently and sharing resources such as memory, while different processes do not share these resources. In particular, the threads of a process share its executable code and the values of its variables at any given time.

Kernel: the central part of an operating system. It manages the tasks of the computer and the hardware—most notably memory and CPU time. The kernel is the most fundamental part of an operating system. It can be thought of as the program which controls all other programs on the computer.

In most instances a computer user never interacts directly with the kernel. It runs behind the scenes.

File system filter driver: a file system filter driver is an optional driver that adds value to or modifies the behaviour of a file system. In the case of the Windows operating system a file system filter driver is a kernel-mode component that runs as part of the Windows executive;

A file system filter driver can filter I/O operations for one or more file systems or file system volumes. Depending on the nature of the driver, filter can mean log, observe, modify, or even prevent. Typical applications for file system filter drivers include antivirus utilities, encryption programs, and hierarchical storage management systems.

Addin (or plug-in, plugin, add-in, add-on, addon, or extension): is a software component that adds a specific feature to an existing computer program. When a program supports plug-ins, it enables customization. The common examples are the plug-ins used in web browsers to add new features such as search-engines, virus scanners, or the ability to use a new file type such as a new video format. Well-known browser plug-ins include the Adobe Flash Player, the QuickTime Player, and the Java plug-in, which can launch a user-activated Java applet on a web page to its execution on a local Java virtual machine.

Applications support plug-ins for many reasons. Some of the main reasons include:
   to enable third-party developers to create abilities which extend an application
   to support easily adding new features
   to reduce the size of an application
   to separate source code from an application because of incompatible software licenses.

At least some embodiments of the present invention provide an architecture, method and apparatus which provides additional functionality to applications on a computer system to give the applications the ability to display, capture and manage file metadata. In preferred forms, the architecture, method and apparatus operate without requiring modification of source code of the application. In preferred forms it also has no dependency on the application having an extension Application Programming Interface for reception of addin (plug-in) components.

Accordingly in one broad form of the invention there is provided a system for displaying and capturing file metadata of an application data file stored on a computer; said computer including a processor and memory; said memory storing an operating system for managing operations of the computer; said memory further storing a kernel of the operating system; said computer further including a user interface and at least one installed application installed on said computer for interacting with a user which, when executed by the processor under the control of the operating system, processes said application data file; said system comprising:
   a. a File System Metadata Filter Driver installed on said computer, whereby said kernel of said operating system signals said File System Metadata Filter Driver when said installed application accesses said application data file;
   b. at least one Metadata Application Thread, which the system injects into said installed application when an application process for execution of said installed application is created, whereby said Metadata Application Thread handles messages generated by said installed application and modifies the user interface of said installed application to display information related to installed application file metadata of said installed application;
   c. Said memory including Metadata Storage which stores said application file metadata, from which said at least one Metadata Application Thread reads said file metadata, and to which said at least one Metadata Application Thread writes said installed application file metadata;
   d. a Metadata Manager operating on said computer, whereby said File System Metadata Filter Driver signals said Metadata Manager when said at least one application data file is accessed, and which in turn notifies said Metadata Application Thread appropriate to that one of said at least one installed application which is accessing said application data file.

Accordingly in yet a further broad form of the invention there is provided a system for displaying and capturing file metadata of an application data file stored on a computer; said computer including a processor and memory; said memory storing an operating system for managing operations of the computer; said memory further storing a kernel of the operating system; said computer further including a user interface and at least one installed application installed on said computer for interacting with a user which, when executed by the processor under the control of the operating system, processes said application data file; and wherein said application has no function to capture custom metadata for said file; said system comprising:
- a. a File System Metadata Filter Driver installed on said computer, whereby said kernel of said operating system triggers said File System Metadata Filter Driver when said installed application accesses said application data file;
- b. a user interface component in the form of a Metadata Application Thread to display information related to said file metadata to the user of said computer; and captures file metadata information from said user;
- c. metadata storage which stores said file metadata and wherein said metadata storage is persistent;
- d. a Metadata Manager operating on said computer, whereby said File System Metadata Filter Driver signals said Metadata Manager when said application data files are accessed, and which in turn notifies said user interface component;

Accordingly in yet a further broad form of the invention there is provided a system for displaying and capturing file metadata of an application data file stored on a computer; said computer including a processor and memory; said memory storing an operating system for managing operations of the computer; said memory further storing a kernel of the operating system; said computer further including a user interface and at least one installed application installed on said computer for interacting with a user which, when executed by the processor under the control of the operating system, processes said application data file; said system further comprising:
- a. Metadata Storage which stores said file metadata, whereby said storage is persistent;
- b. at least one Metadata Application Thread in each said installed application, whereby said Metadata Application Thread intercepts file operation calls from the installed application; handles said messages of said installed application; modifies the user interface of said installed application to display information related to said file metadata to the user of said computer; captures file metadata information from said user; and creates, updates, deletes and otherwise accesses said file metadata from said Metadata Storage;

In a further broad form of the invention there is provided a system to enforce metadata policy on use of data stored in a file without modifying the data in the file to which the meta data policy applies;
said system including a system for displaying and capturing file metadata of an application data file stored on a computer; said computer including a processor and memory; said memory storing an operating system for managing operations of the computer; said memory further storing a kernel of the operating system; said computer further including a user interface and at least one installed application installed on said computer for interacting with a user which, when executed by the processor under the control of the operating system, processes said application data file; said system comprising:
- a. a File System Metadata Filter Driver installed on said computer, whereby said kernel of said operating system signals said File System Metadata Filter Driver when said installed application accesses said application data file;
- b. at least one Metadata Application Thread, which the system injects into said installed application when an application process for execution of said installed application is created, whereby said Metadata Application Thread handles messages generated by said installed application and modifies the user interface of said installed application to display information related to installed application file metadata of said installed application;
- c. Said memory including Metadata Storage which stores said application file metadata, from which said at least one Metadata Application Thread reads said file metadata, and to which said at least one Metadata Application Thread writes said installed application file metadata;
- d. a Metadata Manager operating on said computer, whereby said File System Metadata Filter Driver signals said Metadata Manager when said at least one application data file is accessed, and which in turn notifies said Metadata Application Thread appropriate to that one of said at least one installed application which is accessing said application data file.

In a further broad form of the invention there is provided a system of organization of programme structures and file structures in a computer comprising a processor in communication with a memory in order to enforce metadata policy on use of data stored in a file without modifying the data in the file to which the meta data policy applies;
said system including a system for displaying and capturing file metadata of an application data file stored on the computer; said computer including said processor and said memory; said memory storing an operating system for managing operations of the computer; said memory further storing a kernel of the operating system; said computer further including a user interface and at least one installed application installed on said computer for interacting with a user which, when executed by the processor under the control of the operating system, processes said application data file; said system comprising:
- a. a File System Metadata Filter Driver installed on said computer, whereby said kernel of said operating system signals said File System Metadata Filter Driver when said installed application accesses said application data file;
- b. at least one Metadata Application Thread, which the system injects into said installed application when an application process for execution of said installed application is created, whereby said Metadata Application Thread handles messages generated by said installed application and modifies the user interface of said installed application to display information related to installed application file metadata of said installed application;
- c. Said memory including Metadata Storage which stores said application file metadata, from which said at least one Metadata Application Thread reads said file metadata, and to which said at least one Metadata Application Thread writes said installed application file metadata;
- d. a Metadata Manager operating on said computer, whereby said File System Metadata Filter Driver signals said Metadata Manager when said at least one application data file is accessed, and which in turn notifies said Metadata Application Thread appropriate to that one of said at least one installed application which is accessing said application data file.

In yet a further broad form of the invention there is provided a method for displaying and capturing file metadata of an application data file stored on a computer; said computer including a processor and memory; said memory storing an operating system for managing operations of the computer; said memory further storing a kernel of the operating system; said computer further including a user interface and at least one installed application installed on said computer for interacting with a user which, when executed by the processor under the control of the operating system, processes said application data file; said method comprising:

a. installing a File System Metadata Filter Driver on said computer, whereby said kernel of said operating system signals said File System Metadata Filter Driver when said installed application accesses said application data file;

b. injecting at least one Metadata Application Thread into said installed application when an application process for execution of said installed application is created, whereby said Metadata Application Thread handles messages generated by said installed application and modifies the user interface of said installed application to display information related to installed application file metadata of said installed application;

c. providing Metadata Storage in said memory which stores said application file metadata, from which said at least one Metadata Application Thread reads said file metadata, and to which said at least one Metadata Application Thread writes said installed application file metadata;

d. providing a Metadata Manager operating on said computer, whereby said File System Metadata Filter Driver signals said Metadata Manager when said at least one application data file is accessed, and which in turn notifies said Metadata Application Thread appropriate to that one of said at least one installed application which is accessing said application data file.

Preferably, the system includes configuration information which controls behaviour of said system.

Preferably, said system configuration information which controls behaviour of said system including nominating computer applications on which the system operates.

Preferably, said system modifies said installed application to capture said file metadata of said application data file from said user when said file is being saved within said installed application.

Preferably, said system modifies said user interface of said at least one installed application to allow said user to set metadata appropriate to said application data file.

Preferably, said system modifies a title bar displayed in said user interface of said installed application in order to display said installed application file metadata.

Preferably, said system modifies said application to display said file metadata in a client window of the user interface of said installed application.

Preferably, said system modifies said installed application to overlay said file metadata on a printout when said application data file is printed.

Preferably, said operating system is Microsoft Windows, or Apple OSX, a BSD derived operating system, such as FreeBSD or Open BSD, Linux or some other operating system which allows for additional software components which can be signalled when files are accessed.

Preferably, said application is Microsoft's notepad.exe, or some other application which can open, display, edit and save text files.

Preferably, said application is Microsoft paintbrush.exe, or some other type of application which can open, display, edit and save image files.

Preferably, said application is Microsoft's Word.exe, OpenOffice, LibreOffice, Adobe PageMaker, WPS Office, or some other type of application which can open, display, edit and save document files.

Preferably, said installed application is Windows Media Player or some other type of application which plays back audio files, and wherein said system modifies said installed application to play audio cues associated with metadata of said audio files before, during and/or after the playing back of said audio file.

Preferably, said application plays back video files, such as Windows Media Player. Said system modifies said application to play video and/or audio cues associated with said file's metadata before, during and/or after the playing back of said file.

Preferably, said system modifies said application to display said metadata in the client region of said application during video playback.

Preferably, said application is a system application, such as Windows File Explorer, or some other system or third party application which provides file management functionality to said user, such as copying, moving, deleting, renaming, updating or creating files.

Preferably, said application is a web browser, such as Internet Explorer, Safari, Chrome, Firefox, or some other software application for retrieving, presenting, and traversing information from a computer network, such as the Internet or an Intranet.

Preferably, said file metadata is security classification information.

Preferably, said File System Metadata filter Driver is a Windows mini filter driver, or a Max OS X listener, or some additional operating system kernel component which observes when the computer reads or writes files.

Preferably, said metadata storage is part of said computer's file system, such as Microsoft's Alternate Data Streams (ADS), or some form of extended file attribute, whereby the file system can associate a file with file metadata.

Preferably, said file metadata is stored as properties within said file, such as Microsoft Office's Custom Document Properties, or other file properties which are stored within the file.

Preferably, said file metadata is stored on said computer in a database, such as SQLite, BerkelyDB, or some other database installed on said computer, capable of persistent storage of said file metadata.

Preferably, said file metadata is stored on a computer connected to said computer by a computer network, such as database server, like Microsoft SQL Server or Oracle, or a cloud service, or some other network storage capable of persistent storage of said file metadata.

Preferably, said metadata is stored in a combination of the file system, a local database, a network accessible database, and in said file.

Preferably, said application is capable of transferring files, such as Skype, or Dropbox, or Filezilla, or a browser such as Internet Explorer, Google Chrome, Apple Safari, or Mozilla, or some other application which can copy or move a file from said computer to another computer over a computer network. Said system modifies said application to interrogate the metadata of said file prior to it being transferred, and can reject the transfer of a file, based on rules defined in said configuration.

Preferably, one such rule which may be enforced by said system is that a security classified file can only be transmitted across network channels, and to destinations, with adequate protection.

Preferably, said computer is capable of performing screen capture.

Preferably, said system modifies said application to interrogate the metadata of said file being displayed, and if the display is subject to screen capture.

Preferably, the screen capture uses a screen sharing application, such as Skype, GoToMeeting or WebEx.

Preferably, the screen capture uses image or video capture applications, such as Window Snipping Tool, print screen or SnagIt.

Preferably, said system can block the display of said file during screen capture.

Preferably, said system can inherit metadata from said file being displayed and display in captured image.

Preferably, said system can inherit metadata from said file being displayed and store as metadata in captured image file.

Preferably, said manager tests validity of said file metadata by comparing said metadata with allowable ranges of metadata specified in said configuration and takes corrective action if invalid.

Preferably, said manager uses said configuration to control when said metadata is collected, such as each time said user saves a file through said application, or only when said file metadata does not exist or is invalid.

Preferably, said additional thread provides a user interface to said user which allows the user to enter said metadata, whereby the user initiates the interaction via aid user interface.

Preferably, said user interface is a dialog, or a ribbon bar, or an application menu, or some other user interface control or collection of controls which allows said user to specify information to said system.

Preferably, said configuration controls the selection ranges presented to said user when collecting said metadata.

Preferably, said configuration allows for said file metadata which has one or more values which are hierarchical in nature, whereby the selection of one value, say a primary value, controls the valid ranges of further, or secondary values.

Preferably, said configuration allows for the selection of a minimum security classification, such as SECRET, before any caveat values, such as Releaseability Indicators, or Codewords can be selected.

Preferably, the selection of one caveat value excludes the selection of other caveats. For example, the selection of an EYES-ONLY caveat will invalidate the any RELEASABILITY caveats.

Preferably, said system modifies allowable ranges of metadata specified in said configuration, based on content of said file, and rules defined in said configuration.

Preferably, said additional thread scans said file's content for keywords or numeric sequences, such as credit card numbers, social security numbers, or bank account identifiers, birth dates, or images, or embedded objects, to identify commercially sensitive or private, or otherwise sensitive information.

Preferably, on identifying said sensitive information, said system removes invalid options from metadata ranges, which would only allow said user to indicate that said file contains sensitive information.

Preferably, said configuration is stored as persistent data on said computer, such as in the registry, an XML file, a text file, or binary file, or some other storage which contains configuration data.

Preferably, said configuration is managed centrally, say using Group Policy, or a configuration server, or a database, or some other system by which settings are managed centrally or in the cloud, and deployed to one or more said computers connected using a computer network.

Preferably, when a said application writes a said file to said computer system, said File System Metadata Filter Driver scans the associated file stream to check if it contains valid metadata, and if not, notifies said manager component that metadata is missing.

Preferably, when a said application writes a said file to said computer system, said File System Metadata Filter Driver injects said collected metadata into the file stream.

Preferably, said files are stored on a hard drive on said computer, or on a removable drive, or on a computer network to which said computer is connected, or cloud storage, or some other system on which files can be stored and retrieved.

Preferably, said computer network is a local area network, an Intranet, Extranet or the Internet, or some other form of telecommunications network which allows computers to exchange data.

Preferably, the system further includes system configuration information which control behaviour of said system including nominating computer applications on which the system operates.

Preferably said user interface component uses a notification area of said operating system.

Preferably said notification area is the Windows Notification Area (System Tray), or the Status Menu of Apple OS X.

Preferably, there is provided a non-transitory computer-readable medium coded to implement the system described above.

Preferably, there is provided a non-transitory computer-readable medium coded to implement the method described above.

DETAILED DESCRIPTION OF PREFERRED EMBODIMENTS

Figure 1:
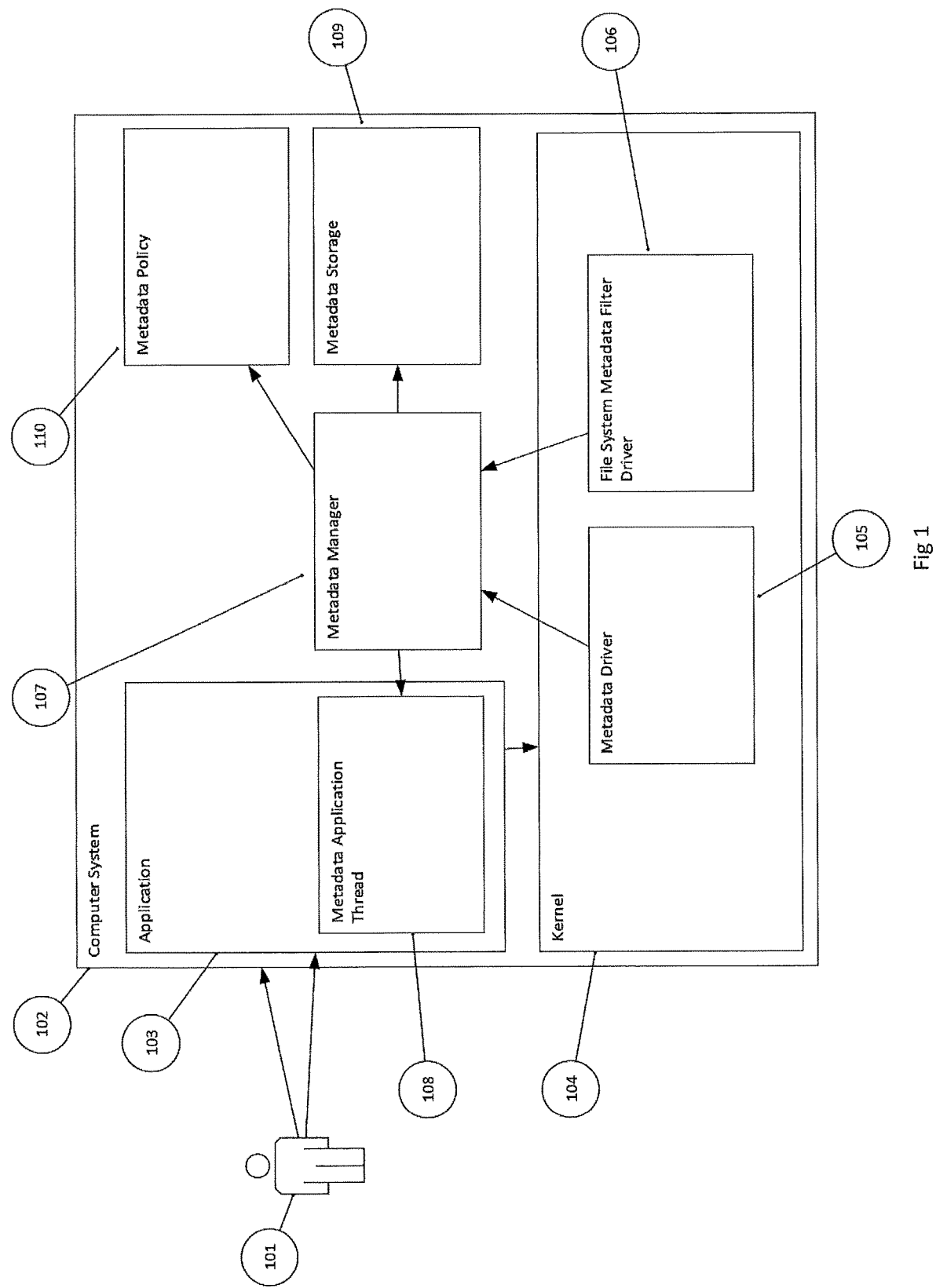
FIG. 1: System diagram showing major system components.

Referring to FIG. 1, which shows system components used to enforce metadata policy on user applications on a desktop computer.

The user (101) interacts with the computer system (102), with the objective of completing various tasks. Applications (103) are installed on the computer to aid in the completion of those tasks. The user will use the computer system to launch one or more applications.

Applications will access file data using the file system. The kernel (104) contains various components to interact with the computer system's hardware and to manage operation. One such component is the Metadata Driver (105), which detects when processes are created or closed. Another kernel component is the File System Metadata Filter Driver (106) which detects when files are opened for reading, or saved by applications.

The Metadata Storage (109) stores file metadata for files on the computer system.

The Metadata Application Thread (108) is loaded into the Application. The Metadata Application Thread modifies the appearance of the Application on the computer system, to display metadata to the user, relevant to the file which the Application accesses. It also presents an interactive control to the user, so that the user can specify metadata relevant to the file while using the application.

The Metadata Manager (107) co-ordinates operations between the components. It receives signals from the Metadata Driver and the File System Metadata Filter Driver, so it can respond to events. It creates the Metadata Application Thread and loads in into the Application. It accesses file metadata from the Metadata Storage. It signals the Metadata Application Thread when new metadata is available.

Figure 2:
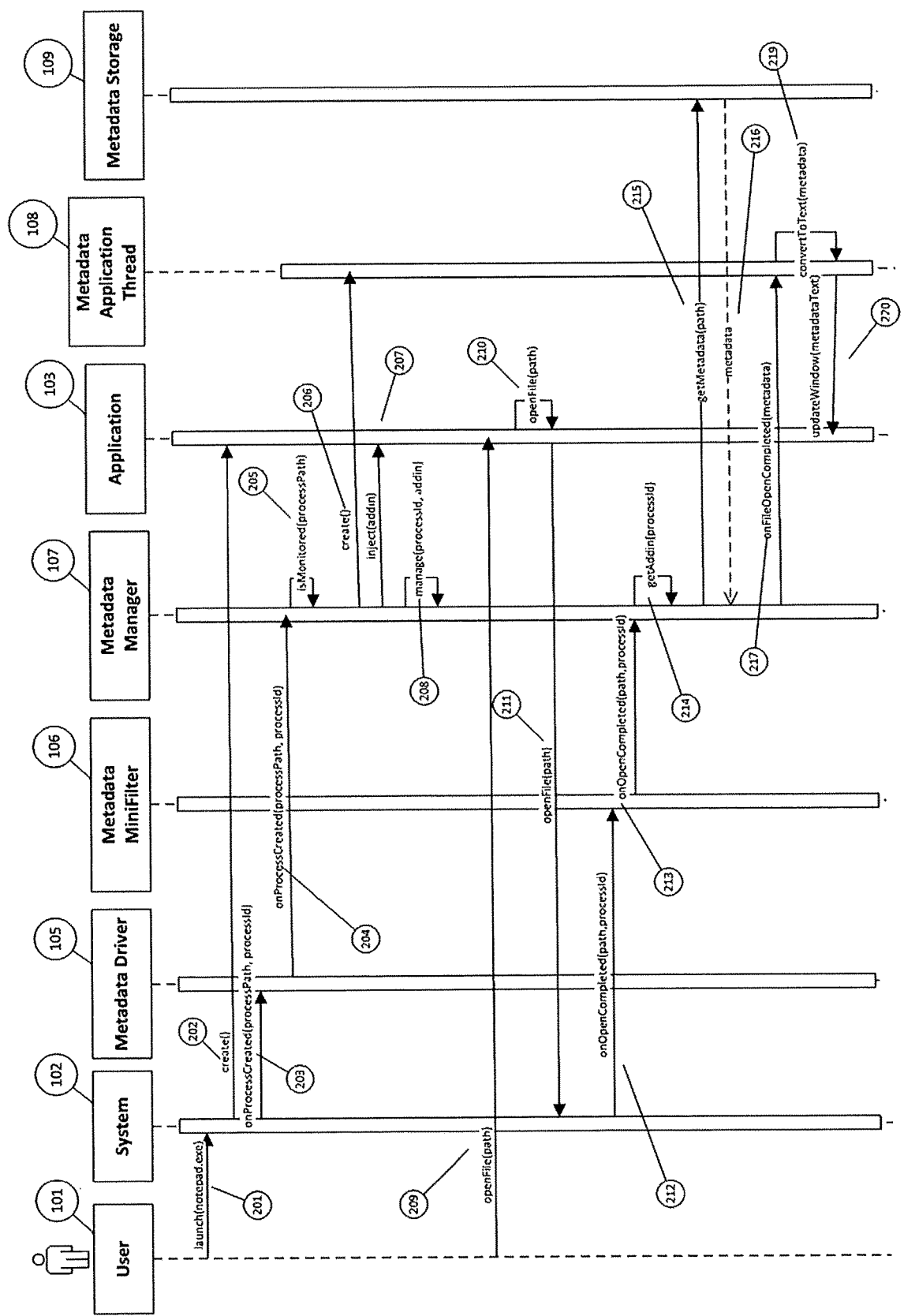
FIG. 2: Sequence diagram showing how a Windows application can display the metadata of a file it has opened.

Referring to FIG. 2, which is a sequence diagram showing how a Windows application can display the metadata of a file it has open.

The User (101) interacts with the Operating System (102) to launch the application (201). The operating system loads the Application (103, 202). The operating system kernel (104), which is part of the Operating System (102) signals the Metadata Driver (105) that a process has been created (203). It provides the process identifier and application path name as part of the signal information. The Metadata Driver signals the Metadata Manager (107) that the process has been created (204). The Metadata Manager checks that the newly created process should be monitored (205) by comparing the process' application path with known processes to monitor. The set of processes to monitor is part of the Metadata Policy (110).

The Metadata Manager creates a Metadata Application Thread (108)(206), which it injects into the Application's process (207). The Metadata Manager keeps a reference of the process identifier and the Metadata Application Thread (208).

At a later stage, the User (101) interacts with the application (103) to open a file (209). The Application makes internal call to open the file (210) which in turn makes a call to the system (102) to open the file (211). The system signals the File System Metadata Filter Driver (106) that a file is being opened (212). The file path and the Applications' process identifier are contained in the information in the signal. The File System Metadata Filter Driver signals the Metadata Manager (107) about the file activity (213). The Metadata Manager retrieves the reference of the Metadata Application Thread, based on the process identifier from the signal (214). The Metadata Manager retrieves the file metadata (215, 216) from the Metadata Storage (109), based on the file's path that it received in the signal (213).

The Metadata Manager (107) signals to the Metadata Application Thread (108) that the file open is completed, with the file's metadata (217). The Metadata Application Thread converts the file metadata to text suitable for display to the user (219). It can use configuration from the Metadata Policy to decide which parts of the file metadata to display, how to translate it, and where to locate the display in the Application. The Metadata Application Thread updates the Application's window with the text (220).

Figure 3:
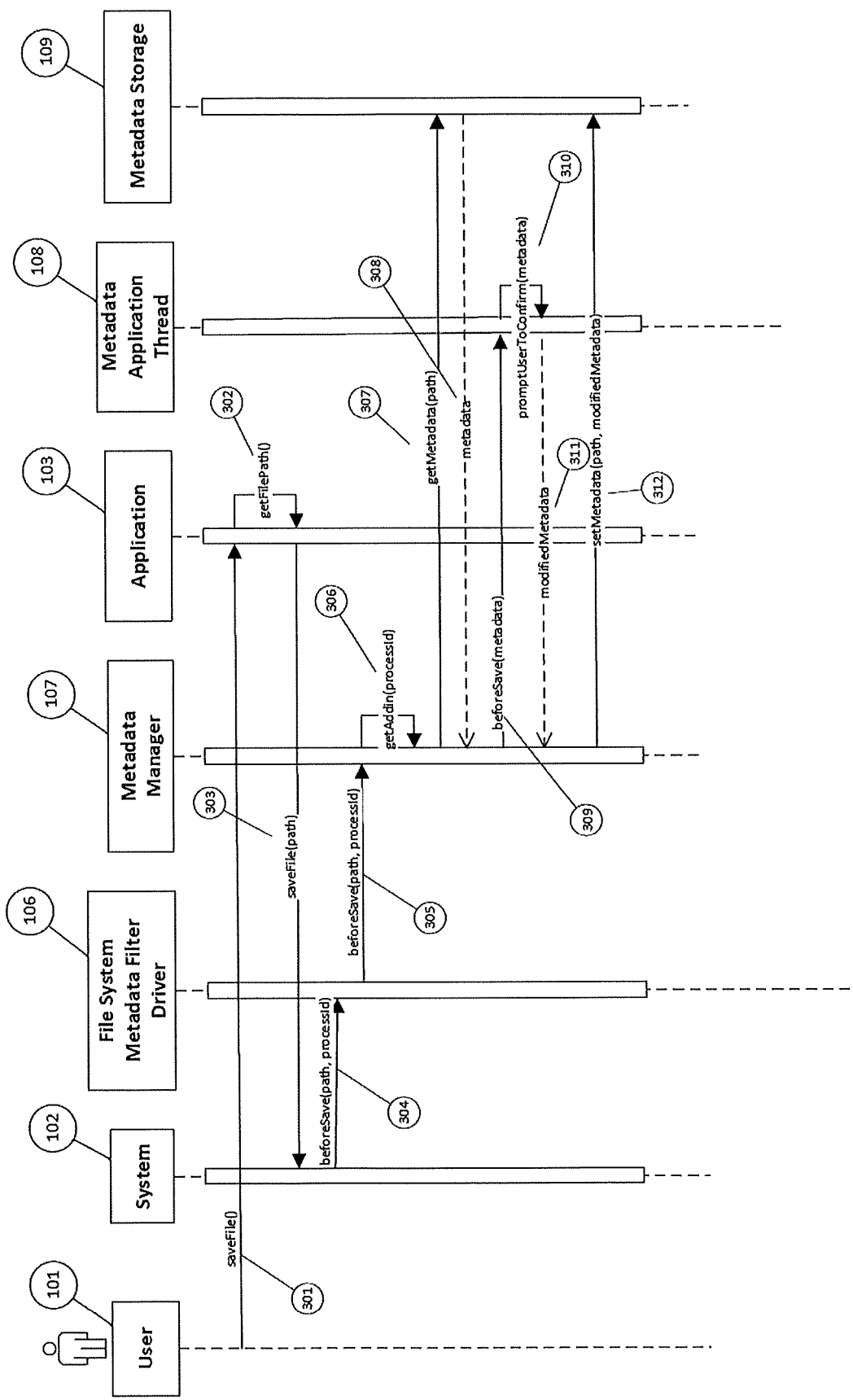
FIG. 3: Sequence diagram showing the capture of file metadata when the file is saved.

Referring to FIG. 3, which shows the flow of control undertaken to capture of file metadata when the file is saved.

The user (101) interacts with the Application (103) to save the file which is being displayed or edited (301). The Application retrieves the file path from memory (302). Alternatively, the user may specify a new path to which to save the file. The Application makes a call to the System (102) to save the file to the specified path (303). The System notifies the File System Metadata Filter Driver (106) that a file is to be saved, and passes parameters including the file path and the process identifier (304). The File System Metadata Filter Driver notifies the Metadata Manager (107) with the same parameters (305). Using the process identifier, the Metadata Manager retrieves (306) the Metadata Application Thread (108) that was created when the file was opened (206). The Metadata Manager (107) retrieves (307) the file's metadata from Metadata Storage (109), which is returned to the Metadata Manager (308). In some cases, the file may not have metadata (not shown) and no metadata will be returned.

The Metadata Manager notifies the Metadata Application Thread (108) that the file is being saved (309), and provides the metadata, if it exists. The Metadata Application Thread prompts the user to confirm the metadata (310). The user can modify the metadata as necessary. If no metadata exists for the file, the user selects valid metadata. The Metadata Application Thread returns the metadata to the Metadata Manager (107). The Metadata Manager writes the metadata to the Metadata Storage (109), indexed by the file path (312).

Figure 4:
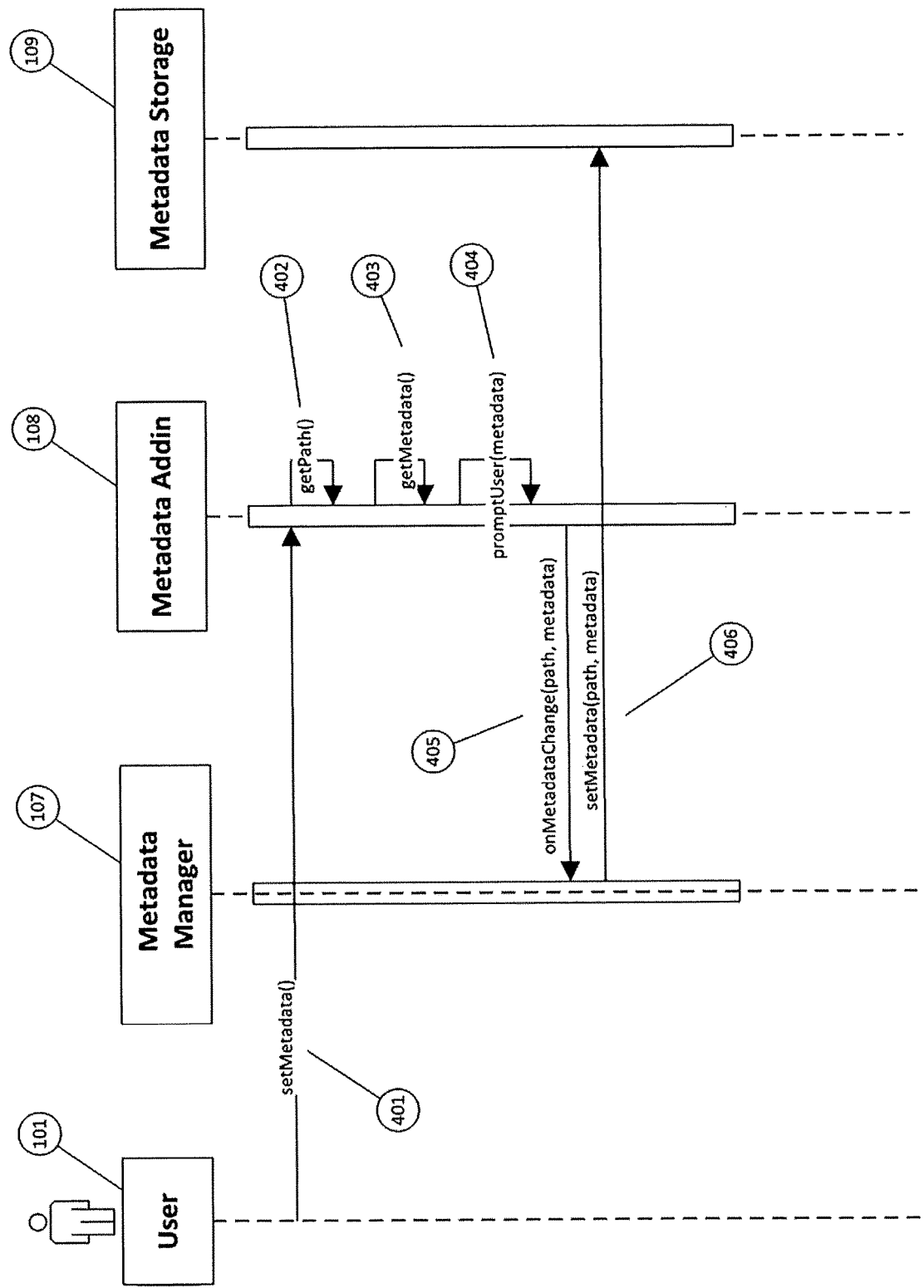
FIG. 4: Sequence diagram showing the capture of file metadata when activated by the user.

Referring to FIG. 4, which shows the capture of file metadata when activated by the user.

The user (101) interacts with the Metadata Application Thread (108) to set the metadata of the file which the Application (103) is displaying (401). The Metadata Application Thread has extended the user interface of the Application with additional controls (see FIG. 5). The Metadata Application Thread retrieves from memory the path of the file being displayed (402). The Metadata Application Thread gets from memory the existing metadata for the file (403). The Metadata Application Thread prompts the user with the existing metadata, which the user may modify (404). The Metadata Application Thread notifies the Metadata Manager (107) of changes, and provides the path and the updated metadata (405). The Metadata Manager writes the metadata to the Metadata Storage (109), indexed by the file path (406).

Figure 5:
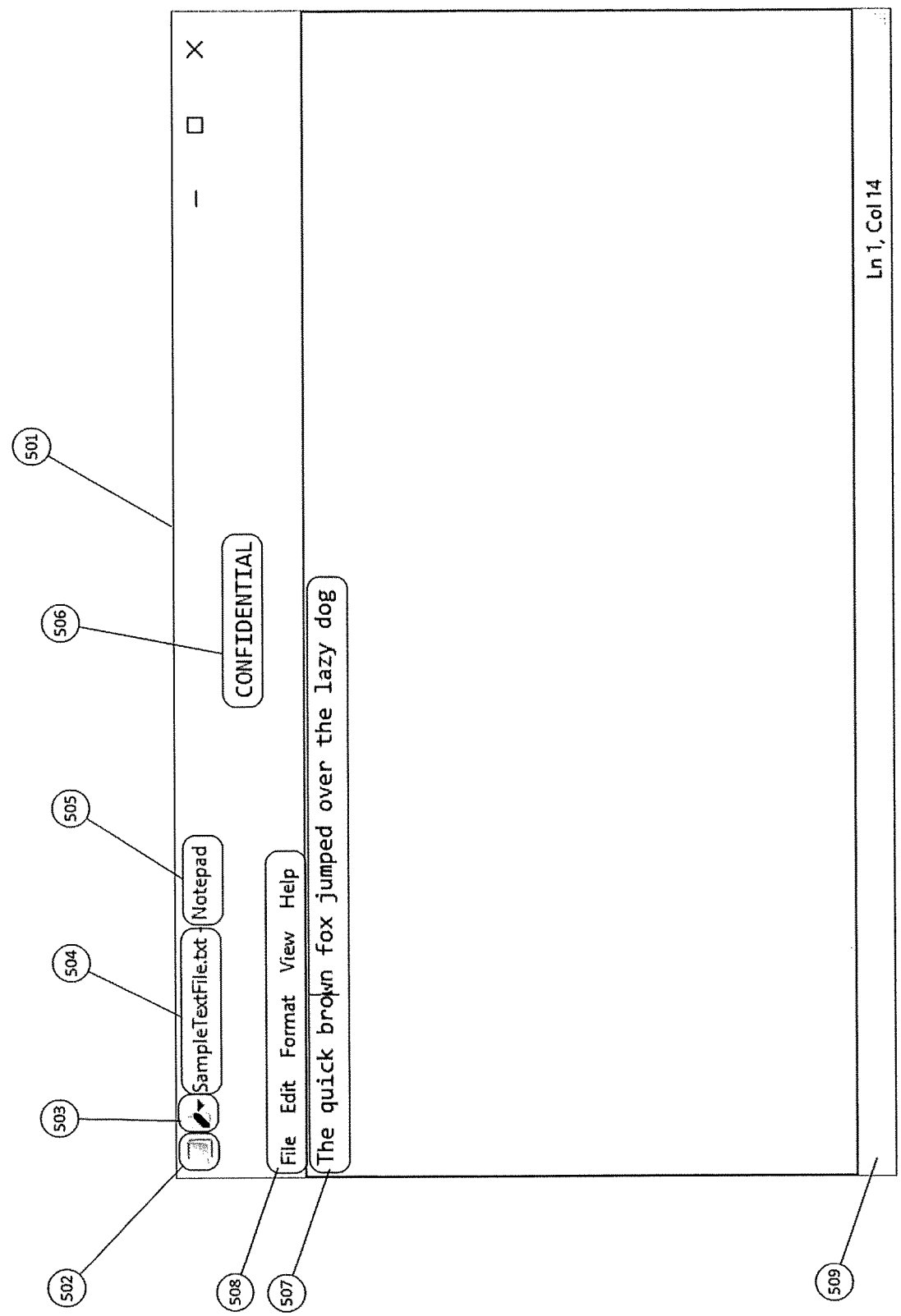
FIG. 5: Modified Notepad.exe application showing file's classification and classification menu.

Referring to FIG. 5, which shows the Microsoft Windows Notepad.exe application (text editor), as extended by the invention, operating on Microsoft Windows 10.

The Application, Notepad.exe, is shown, contained by the Window Border (501),

The title bar includes the Control Menu box (502) and shows the file name of the file being edited (504), and the application name (505). The title bar has been extended by the addition of a classification control (503).

The Menu bar (508) shows the options available to the user when using the application.

The Status bar (509) shows the Application's status. In this example it displays the cursor position.

The client area of the application window shows the content of the file (507).

The image also shows how the application window is further extended by the System. The file metadata is displayed (506). In this case the security classification of the file is shown between the title bar and the menu bar.

Further Embodiment

Figure 6:
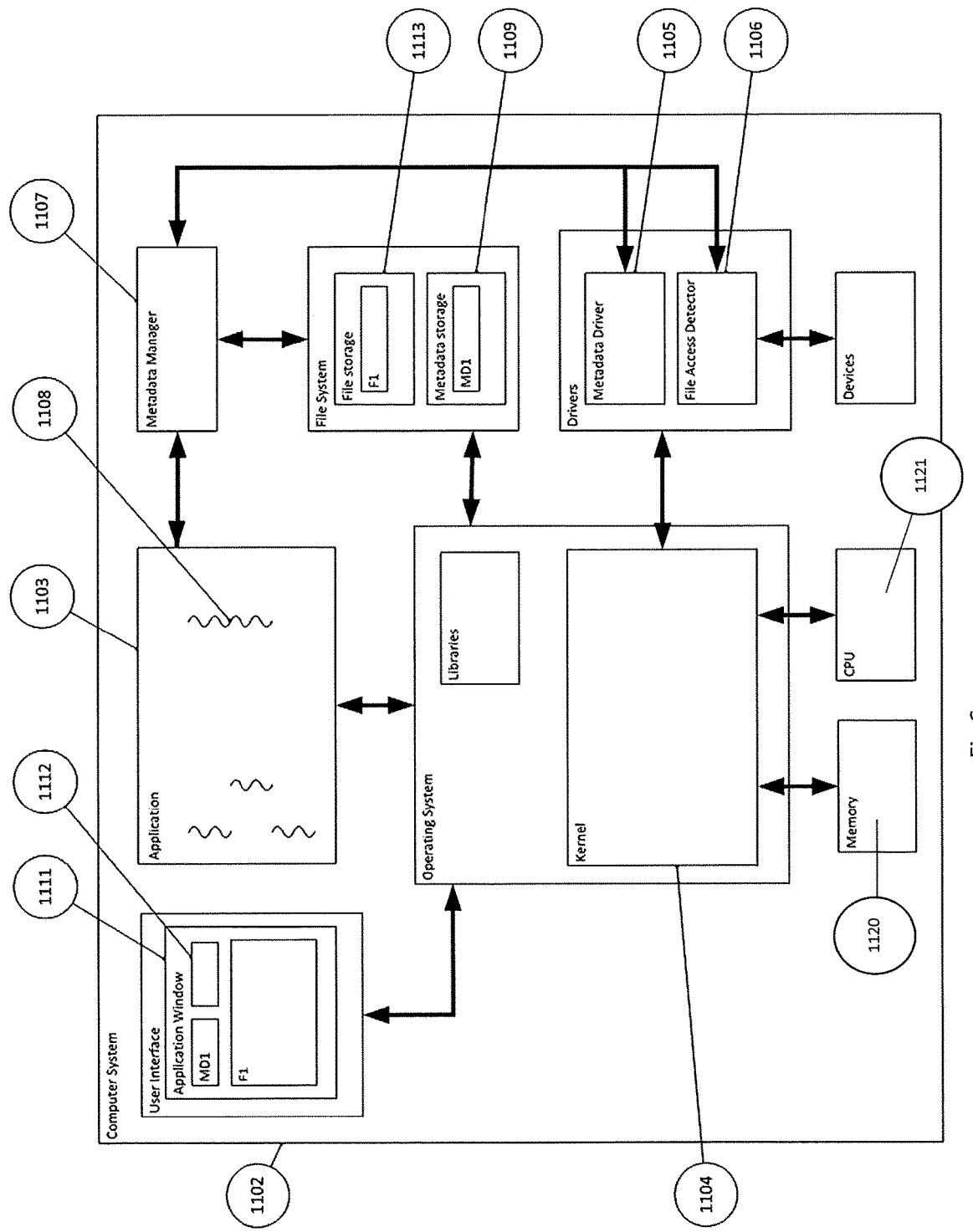
FIG. 6: Block diagram of a system for enforcing collection and display of computer file metadata in accordance with a further embodiment of the present invention.
Figure 7:
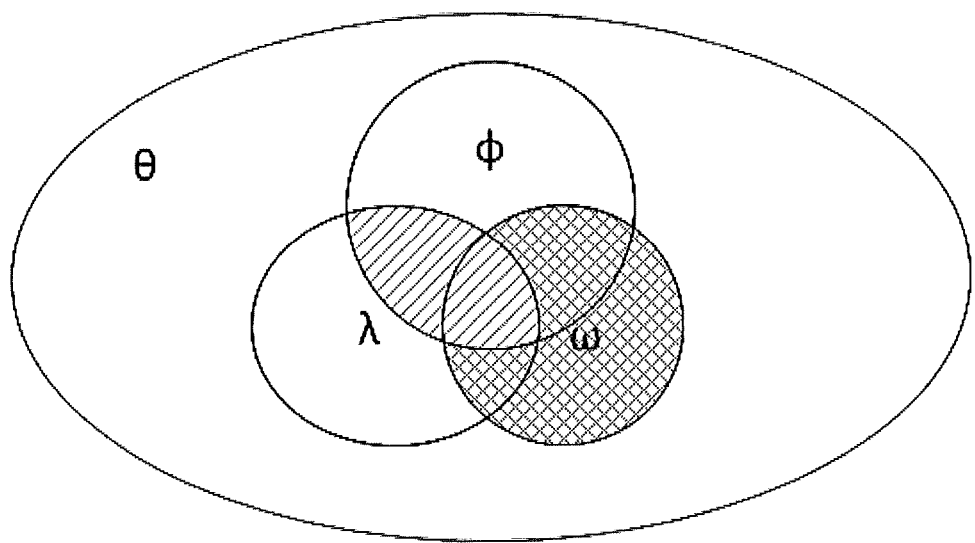
FIG. 7 is a Venn Diagram display of types of applications available to an indicative organisation to complete computer assisted tasks.

FIG. 6 describes a further embodiment of the present invention wherein like components are numbered as for components described in earlier embodiments except in the 1000 series.

It describes in block diagram form apparatus and methodology to enforce the data policy on use of data stored in a file without modifying the data in the file to which the metadata policy applies.

Referring to FIG. 6, there is shown system components used to enforce metadata policy on user applications on a desktop computer in accordance with a further embodiment of the present invention.

The user (not shown) interacts with the computer system (1102), with the objective of completing various tasks. Applications (1103) are installed on the computer to aid in the completion of those tasks. The user will use the computer system to launch one or more applications.

Applications will access file data using the file system. The kernel (1104) contains various components to interact with the computer system's hardware and to manage operation. One such component is the Metadata Driver (1105), which detects when processes are created or closed. Another kernel component is the File System Metadata Filter Driver (1106) which observes when files are opened for reading, or saved by applications.

The Metadata Storage (1109) contains file metadata for files including the metadata MD-1 for file F-1 on the computer system. In a preferred form the files including file F-1 are stored in separate file data storage (1110). More preferably the separate file data storage 1110 is logically separate storage from the file metadata storage 1109.

The Metadata Application Thread (1108) which is executable as an additional thread in the application 1103 is loaded into the Application 1103. The Metadata Application Thread 1108 modifies the appearance, e.g. Application Window, of the user interface (1111) generated by the Application 1103 on the computer system 1102, in order to display metadata including meta data MD-1 to the user, relevant to the file F-1 which the Application accesses. It also presents an interactive control (1112) on the Application's user interface 1111 to the user, so that the user can specify metadata including metadata MD-1 relevant to the file F-1 while using the application 1103.

The Metadata Manager (1107) co-ordinates operation between the components. It receives signals from the Metadata Driver 1105 and the file access detector in this instance in the form of File System Metadata Filter Driver 1106, so it can respond to events. It creates the Metadata Application Thread 1108 and loads it into the Application 1103. It accesses file metadata including metadata MD-1 from the Metadata Storage 1109. It signals the Metadata Application Thread executing as thread 1108 when new metadata including metadata MD-1 is available.

In one particular form code to implement the system and method of any of the previously described embodiments is stored on a non-transitory medium such as a memory device. The code can then be loaded into memory 1120 from the non-transitory medium for execution by CPU 1121.

INDUSTRIAL APPLICABILITY

Embodiments of the invention provide data structures and program structures for the handling and the display of metadata including, in particular metadata associated with layered security systems.

The invention claimed is:

1. A system for displaying and capturing file metadata of an application data file stored on a computer; said computer including a processor and memory; said memory storing an operating system for managing operations of the computer; said memory further storing a kernel of the operating system; said computer further including a user interface and at least one installed application installed on said computer for interacting with a user which, when executed by the processor under the control of the operating system, processes said application data file; said system comprising:
   a. a File System Metadata Filter Driver installed on said computer, whereby said kernel of said operating system signals said File System Metadata Filter Driver when said installed application accesses said application data file;
   b. at least one Metadata Application Thread, which the system injects into said installed application when an application process for execution of said installed application is created, whereby said Metadata Application Thread handles messages generated by said installed application and modifies the user interface of said installed application to display information related to installed application file metadata of said installed application;
   c. Said memory including Metadata Storage which stores said application file metadata, from which said at least one Metadata Application Thread reads said file metadata, and to which said at least one Metadata Application Thread writes said installed application file metadata;
   d. a Metadata Manager operating on said computer, whereby said File System Metadata Filter Driver signals said Metadata Manager when said at least one application data file is accessed, and which in turn notifies said Metadata Application Thread appropriate to that one of said at least one installed application which is accessing said application data file;
wherein said computer is capable of performing screen capture; and wherein said system modifies said application to interrogate the metadata of said file being displayed, and if the display is subject to screen capture; and wherein said system can block the display of said file during screen capture; and wherein the screen capture uses a screen sharing application, such as Skype, GoToMeeting or WebEx; or wherein the screen capture uses image or video capture applications, such as Window Snipping Tool, print screen or SnagIt.

2. The system of claim 1, wherein said system modifies said installed application to capture said file metadata of said application data file from said user when said file is being saved within said installed application.

3. The system of claim 1, wherein said system modifies said user interface of said at least one installed application to allow said user to set metadata appropriate to said application data file.

4. The system of claim 1, wherein said system modifies a title bar displayed in said user interface of said installed application in order to display said installed application file metadata.

5. The system of claim 1, wherein said system modifies said application to display said file metadata in a client window of the user interface of said installed application.

6. The system of claim 1, wherein said system modifies said installed application to overlay said file metadata on a printout when said application data file is printed.

7. The system of claim 1, wherein said operating system is Microsoft Windows, or Apple OSX, a BSD derived operating system, such as FreeBSD or Open BSD, Linux or some other operating system which allows for additional software components which can be signalled when files are accessed.

8. The system of claim 1, wherein said application is Microsoft's notepad.exe, or some other application which can open, display, edit and save text files; or wherein said application is Microsoft paintbrush.exe, or some other type of application which can open, display, edit and save image files; or wherein said application is Microsoft's Word.exe, OpenOffice, LibreOffice, Adobe PageMaker, WPS Office, or some other type of application which can open, display, edit and save document files; or wherein said installed application is Windows Media Player or some other type of application which plays back audio files, and wherein said system modifies said installed application to play audio cues associated with metadata of said audio files before, during and/or after the playing back of said audio file; or wherein said application is a system application, such as Windows File Explorer, or some other system or third party application which provides file management functionality to said user, such as copying, moving, deleting, renaming, updating or creating files; or wherein said application is a web browser, such as Internet Explorer, Safari, Chrome, Firefox, or some other software application for retrieving, presenting, and traversing information from a computer network, such as the Internet or an Intranet.

9. The system of claim 1, wherein said application plays back video files, such as Windows Media Player, wherein, said system modifies said application to play video and/or audio cues associated with said file's metadata before, during and/or after the playing back of said file; and wherein said system modifies said application to display said metadata in the client region of said application during video playback.

10. The system of claim 1, wherein said file metadata is security classification information.

11. The system of claim 1, wherein said File System Metadata filter Driver is a Windows mini filter driver, or a Max OS X listener, or some additional operating system kernel component which observes when the computer reads or writes files.

12. The system of claim 1, wherein said metadata storage is part of said computer's file system, such as Microsoft's Alternate Data Streams (ADS), or some form of extended file attribute, whereby the file system can associate a file with file metadata; and wherein said file metadata is stored as properties within said file, such as Microsoft Office's Custom Document Properties, or other file properties which are stored within the file; and wherein said file metadata is stored on said computer in a database, such as SQLite, BerkelyDB, or some other database installed on said computer, capable of persistent storage of said file metadata; and wherein said file metadata is stored on a computer connected to said computer by a computer network, such as database server, like Microsoft SQL Server or Oracle, or a cloud service, or some other network storage capable of persistent storage of said file metadata; and wherein said metadata is stored in a combination of the file system, a local database, a network accessible database, and in said file.

13. The system of claim 1, wherein said application is capable of transferring files, such as Skype, or Dropbox, or Filezilla, or a browser such as Internet Explorer, Google Chrome, Apple Safari, or Mozilla, or some other application which can copy or move a file from said computer to another computer over a computer network; and wherein said system modifies said application to interrogate the metadata of said file prior to it being transferred, and can reject the transfer of a file, based on rules defined in said configuration; and wherein one such rule which may be enforced by said system is that a security classified file can only be transmitted across network channels, and to destinations, with adequate protection.

14. The system of claim 1, wherein said system can inherit metadata from said file being displayed and display in captured image; or wherein said system can inherit metadata from said file being displayed and store as metadata in captured image file.

15. The system of claim 1, wherein said Metadata Application Thread provides a user interface to said user which allows the user to enter said metadata, whereby the user initiates the interaction via aid user interface; and wherein said user interface is a dialog, or a ribbon bar, or an application menu, or some other user interface control or collection of controls which allows said user to specify information to said system.

16. The system of claim 1, wherein said Metadata Application Thread scans said file's content for keywords or numeric sequences, such as credit card numbers, social security numbers, or bank account identifiers, birth dates, or images, or embedded objects, to identify commercially sensitive or private, or otherwise sensitive information; and wherein on identifying said sensitive information, said system removes invalid options from metadata ranges, which would only allow said user to indicate that said file contains sensitive information.

17. The system of claim 1, wherein when a said application writes a said file to said computer system, said File System Metadata Filter Driver injects said collected metadata into the file stream.

18. The system of claim 1, wherein said files are stored on a hard drive on said computer, or on a removable drive, or on a computer network to which said computer is connected, or cloud storage, or some other system on which files can be stored and retrieved.

19. A system of organization of programme structures and file structures in a computer comprising a processor in communication with a memory in order to enforce metadata policy on use of data stored in a file without modifying the data in the file to which the meta data policy applies;
  a. said system including a system for displaying and capturing file metadata of an application data file stored on the computer; said computer including said processor and said memory; said memory storing an operating system for managing operations of the computer; said memory further storing a kernel of the operating system; said computer further including a user interface and at least one installed application installed on said computer for interacting with a user which, when executed by the processor under the control of the operating system, processes said application data file; said system comprising:
    a. a File System Metadata Filter Driver installed on said computer, whereby said kernel of said operating system signals said File System Metadata Filter Driver when said installed application accesses said application data file;

b. at least one Metadata Application Thread, which the system injects into said installed application when an application process for execution of said installed application is created, whereby said Metadata Application Thread handles messages generated by said installed application and modifies the user interface of said installed application to display information related to installed application file metadata of said installed application;

c. Said memory including Metadata Storage which stores said application file metadata, from which said at least one Metadata Application Thread reads said file metadata, and to which said at least one Metadata Application Thread writes said installed application file metadata;

d. a Metadata Manager operating on said computer, whereby said File System Metadata Filter Driver signals said Metadata Manager when said at least one application data file is accessed, and which in turn notifies said Metadata Application Thread appropriate to that one of said at least one installed application which is accessing said application data file;

wherein said computer is capable of performing screen capture; and wherein said system modifies said application to interrogate the metadata of said file being displayed, and if the display is subject to screen capture; and wherein said system can block the display of said file during screen capture; and wherein the screen capture uses a screen sharing application, such as Skype, GoToMeeting or WebEx; or wherein the screen capture uses image or video capture applications, such as Window Snipping Tool, print screen or SnagIt.

* * * * *